United States Patent [19]

Ohshima et al.

[11] 4,164,818

[45] Aug. 21, 1979

[54] METHOD FOR PREVENTING ADHESIVENESS OF A HYDROGEL OF A WATER-SOLUBLE ACRYLAMIDE-TYPE POLYMER

[75] Inventors: Iwao Ohshima; Yukio Shibuya; Hisao Otani, all of Yokohama, Japan

[73] Assignees: Nitto Chemical Industry Co., Ltd.; Mitsubishi Rayon Co., Ltd., both of Tokyo, Japan

[21] Appl. No.: 843,913

[22] Filed: Oct. 20, 1977

[30] Foreign Application Priority Data

Oct. 20, 1976 [JP]  Japan .................. 51/125007

[51] Int. Cl.$^2$ .............................................. F26B 7/00
[52] U.S. Cl. .................................... 34/12; 34/9
[58] Field of Search ................................ 34/9, 12, 17

[56] References Cited

U.S. PATENT DOCUMENTS

| | | | |
|---|---|---|---|
| 2,561,256 | 7/1951 | Wilson et al. | 34/9 X |
| 3,634,944 | 1/1972 | Zonis et al. | 34/12 |
| 3,905,122 | 9/1975 | Ohshima et al. | 34/17 |

*Primary Examiner*—John J. Camby
*Attorney, Agent, or Firm*—Sughrue, Rothwell, Mion, Zinn and Macpeak

[57] ABSTRACT

A method for preventing the surface of a hydrogel of a water-soluble acrylamide-type polymer from being tacky, which comprises coating the surface of the hydrogel with at least one of a higher fatty acid or an alkali metal salt thereof.

7 Claims, No Drawings

METHOD FOR PREVENTING ADHESIVENESS OF A HYDROGEL OF A WATER-SOLUBLE ACRYLAMIDE-TYPE POLYMER

BACKGROUND OF THE INVENTION

1. Field of the Invention

This invention relates to a method for preventing the surface of a hydrogel of a water-soluble acrylamide-type polymer from being tacky.

2. Description of the Prior Art

Water-soluble polymers such as polyacrylamides, partially hydrolyzed products (anionic) of polyacrylamides or cationic or nonionic copolymers containing acrylamide (referred to hereinafter generically as an acrylamide-type polymer) have gained markedly increased acceptance in recent years as paper sizes, sheet-forming thickeners, water-treatment flocculating agents or enhanced oil recovery agents.

Known methods for producing acrylamide-type polymers include, for example, aqueous solution polymerization, suspension polymerization or precipitation polymerization. The aqueous solution polymerization method has been most widely used because it is economical and affords high-molecular-weight polymers easily. In order to conduct the aqueous solution polymerization method economically in the polymerization or drying step, it is desirable to maintain the concentration of starting monomer at a high level during polymerization.

However, when the monomer concentration during polymerization is gradually increased, the polymer becomes a highly viscous hydrogel, and handling of the polymer as a fluid becomes difficult. This would be an incentive to the development of a method for producing a powdery polymer which is easy to handle and which dissolves in water, by crushing the highly viscous gel, drying the gel with a rotary cylindrical dryer or a belt-type dryer, and then pulverizing the dried particles.

Because of the tackiness of the polymeric hydrogel being handled, its adhesion to other materials and to itself is very great, and this constitutes a marked disadvantage in the drying of the polymeric hydrogel. An attempt to solve this problem is disclosed in Japanese Patent Application (OPI) No. 135253/74 (corresponding to U.S. Pat. No. 3,905,122). The present invention is an improvement over this prior method.

Adhesion of a hydrogel (referred to hereinafter simply as a gel) of an acrylamide-type polymer to other materials and to itself is extremely great, and as a matter of course, a reduction of its adhesiveness is desirable even when the method of Japanese Patent Application (OPI) No. 135253/74 is to be performed.

Generally, in dealing with a highly adhesive material, the use of a container made of a material with good release properties is generally considered. Usually, fluorocarbon resins, of which polytetrafluoroethylene is typical, and polyolefins such as polyethylene or polypropylene have often been employed. The general practice is to use such a material with good release properties, and also to coat a suitable mold releasing agent on the material.

In order to accomplish this, various mold releasing agents have been developed, and typical examples of mold releasing agents are metal soaps, fatty acid amides, saturated hydrocarbons, and natural waxes. Certain silicon-containing compounds which are relatively stable chemically and do not affect the polymerization reaction may also be used as mold releasing agents.

Low adhesiveness of particles of the gel to each other is desirable to avoid a re-coalescence of small lumps of gel for drying, to prevent adhesion of small lumps of the gel during drying, and also to ensure the separation of the small lumps of the gel during or after drying into individual particles.

Good results would be obtained if the inside wall surface of the dryer is made of a non-tacky material. It is readily conceivable that the difficulties which are caused by the adhesion of gels to other materials could be avoided by constructing the surfaces of the other materials with a non-tacky material. Such a non-tacky material is usually a non-metallic material, and has low mechanical strength. Thus, the durability of such a non-tacky material in long-term operation under the severe conditions encountered in commercial operations is undesirably short. Another means for reducing the difficulties caused by the adhesion of gels to other materials is to use a mold releasing agent. Coating of the mold releasing agent on areas contacting the gel is effective for reducing the adhesiveness, and satisfactory results can be obtained in certain circumstances. However, the durability of mold releasing agents is shorter than that of non-tacky materials, and therefore, frequent coating of fresh mold releasing agent is required. During the re-coating operation, the operation should be stopped, and also the amount of labor involved in the re-coating operation is high.

The present invention offers a solution to these problems. It permits the adhesiveness of gels to be reduced, difficulties caused by the adhesion of gels to be eliminated even where the areas of the dryer which contact the gel are made of common metallic materials, and the adhesiveness of small gel particles to each other to be reduced and difficulties during drying to be removed.

SUMMARY OF THE INVENTION

Extensive investigations have now been made in order to reduce the adhesion of a hydrogel of an acrylamide-type polymer to other materials and to itself when crushing the gel into small lumps and drying the small lumps with hot air under a shearing force. These investigations have led to the present invention.

Accordingly the present invention provides a method for preventing the surface of a hydrogel of a water-soluble acrylamide-type polymer from being tacky, which comprises coating the surface of the hydrogel with a higher fatty acid or an alkali metal salt thereof.

DETAILED DESCRIPTION OF THE INVENTION

The gel which can be treated with the method of this invention should be substantially non-flowable, i.e., is somewhat rigid yet deformable, and should have some degree of hardness. If the concentration of the starting monomer is low at the time of polymerization, the gel is soft and is difficult to handle. For example, for an acrylamide polymer having an average molecular weight of about 8 million, the lower limit of the concentration of the starting monomer is about 18% by weight.

Examples of acrylamide-type polymers which can be treated by the method of this invention include polyacrylamide, partially hydrolyzed products of polyacrylamide, and water-soluble copolymers of acrylamide with other vinyl monomers. A suitable molecular weight range for the nonionic and anionic acrylamide-type polymers to which this invention is applicable can range from about 3,000,000 to about 15,000,000, more generally, about 5,000,000 to about 10,000,000. The moisture content in the polymer gel generally is below about 80%, more generally about 50% to about 80%. Examples of comonomers which can be present in the acrylamide copolymers include cationic vinyl monomers such as dimethylaminoethyl acrylate, dimethylaminoethyl methacrylate, diethylaminoethylacrylate, diethylaminoethyl methacrylate, dimethylaminohydroxypropyl acrylate, dimethylaminohydroxypropyl methacrylate and dimethylaminoethyl acrylamide; cationic vinyl monomers prepared by converting the above-exemplified cationic vinyl monomers to the quaternary ammonium salts thereof using quaternizing agents such as alkyl halides (e.g., methyl chloride, methyl bromide, ethyl chloride and ethyl bromide) and dialkyl sulfates (e.g., dimethyl sulfate, and diethyl sulfate); nonionic monomers such as acrylonitrile, methacrylonitrile, methyl acrylate, ethyl acrylate and methacrylamide; and anionic monomers such as acrylic acid, methacrylic acid and the salts thereof (e.g., the sodium and potassium salt).

In polymerizing such monomers, the concentration of the monomers is adjusted to about 18 to about 30%, preferably about 20 to about 25%. This concentration range, however, is not strictly critical because the hardness of the resulting gel also changes with the composition of the monomer and the molecular weight of the polymer.

The method of this invention can also be used to prevent the mutual adhesion of particles of gels of anionic acrylamide polymers which are especially tacky.

When the nature of the present invention is considered, it will be easily recognized that the higher fatty acid or the alkali metal salt thereof can be present also during the polymerization of acrylamide-type polymers so long as it does not adversely affect the polymerization.

The higher fatty acids which can be used in the method of this invention, which can be used individually or in combination include higher fatty acids containing at least 14 carbon atoms and include mainly saturated fatty acids. Examples of suitable higher fatty acids in general include those higher fatty acids having 14 to 24 carbon atoms, preferably 14 to 18 carbon atoms. Specific examples include myristic acid, stearic acid, palmitic acid, arachidic acid, behenic acid, etc. Stearic acid commercially available is preferred from an economical point of view. The alkali metal salts, e.g., the sodium salt, the potassium salt and the lithium salt, preferably the sodium salt, of these fatty acids can also be used.

Alkali metal salts of fatty acids having less than 14 carbon atoms are ordinary soaps. Polymerization of acrylamide in the presence of these alkali metal salts of fatty acids does not adversely affect the polymerization reaction and the separation effect achieved. However, since in the expulsion of dissolved oxygen before polymerization a large amount of bubbles is formed, it is not desirable to use them in great quantities.

There is no particular upper limit to the number of carbon atoms of the higher fatty acids. As will be shown by an example given hereinbelow, the use of a fatty acid with 22 carbon atoms shows a desired effect in preventing tackiness. The use of fatty acids with larger number of carbon atoms is possible. However, since higher fatty acids having a fairly large number of carbon atoms are uncommon and are quite expensive, the use of such higher fatty acids is economically disadvantageous. In view of this, a suitable upper limit for the number of carbon atoms in the fatty acids is about 24.

A suitable number of the higher fatty acid or the alkali metal salt thereof which is used is not more than about 0.01% by weight based on the monomer weight, and usually a sufficient effect is achieved when an amount of about 0.005 to 0.001% by weight based on the monomer is used.

The solubility of the higher fatty acid in water decreases abruptly as the number of carbon atoms thereof is increased. For example, the solubilities of some representative fatty acids in water at 20° C. are tabulated below.

| Fatty Acid | Number of Carbon Atoms | Solubility (g/100 g of water) |
|---|---|---|
| Myristic Acid | 14 | 0.0020 |
| Palmitic Acid | 16 | 0.00072 |
| Stearic Acid | 18 | 0.00029 |

Usually, sufficient dissolving times and stirring conditions are required in dissolving such a substance having a low solubility in water to achieve saturation. Even where the fatty acid or the alkali metal salt thereof is present during polymerization, it is not always necessary to dissolve such completely.

When the amount of the fatty acid or the alkali metal salt thereof exceeds its solubility, the undissolved portion floats or is suspended on or in the aqueous solution of the monomer. In such a case, too, the effect of this invention can be fully obtained. It can be assumed, therefore, that the effect of the higher fatty acid or the alkali metal salt thereof depends upon a very minor amount thereof being present, i.e., not more than about 0.001% by weight based on the monomer.

This amount is surprisingly small in view of the fact that the amount of such a fatty acid to be incorporated as a lubricant in resins in the ordinary plastic industry to improve the moldability of thermoplastic resins and to prevent tackiness is 0.05 to 2% by weight.

The following embodiments are given to exemplify various applications of the present invention in using a higher fatty acid or the alkali metal salts thereof.

Prior to the drying operations, it is usually desirable for the gel lumps to be crushed into small particles of a size of several millimeters e.g., about 1 to 10 mm, preferably about 3 to about 6 mm, in order to obtain a uniformly dried condition and a rapid drying rate. A device such as a meat mincing machine, or a so-called pelletizer can be suitably employed for this crushing operation. Normally, the crushed gel particles lightly adhere to each other immediately after crushing because of their adhesiveness. By applying the higher fatty acid or the alkali metal salt in the amount as described above to a group of such lightly adhering gel particles, the adhesion of the gel particles to each other and to the inner wall of the dryer, particularly when the wall of the dryer is metallic, can be markedly reduced during the subsequent drying operation.

Various methods are available to add the higher fatty acid or the alkali metal salt thereof. The higher fatty acids or the alkali metal salts thereof used in this invention are solid at room temperature (about 20°–30° C.) and are in the form of flakes or powders. Naturally, a powder form for the higher fatty acid or the alkali metal salt thereof is preferred in order that it can be applied as uniformly as possible to the surfaces of the gel particles. One method of application is to spray a powdery higher fatty acid or the alkali metal salt thereof onto a group of the gel particles. Another method involves preparing an aqueous suspension of the powdery higher fatty acid or the alkali metal salt thereof and then spraying the suspension onto the gel particles. In both of these methods, the higher fatty acid or the alkali metal salt thereof need not necessarily be applied uniformly and equally onto the gel particles immediately after spraying.

The drying method which is benefited most by the effect of the present invention is the "method for drying under application of a shearing force" disclosed in U.S. Pat. No. 3,905,122 (corresponding to Japanese Patent Application (OPI) No. 135253/74), the disclosure of which is incorporated herein by reference. If the method of this invention is employed with this drying method, the gel particles, e.g., generally having a particle size of about 1 to 10 mm, preferably 3 to 6 mm, to which the higher fatty acid or the alkali metal salt thereof has been applied locally and which has been introduced into the dryer are dried while exerting a shearing force on the particles within the dryer. At this time, the gel particles are separated from the adhering surfaces and at the same time are mixed. This mixing action causes the added higher fatty acid or the alkali metal salt thereof to be uniformly mixed with the gel particles, and therefore the effect of adhesion-prevention is uniformly achieved. While the drying time will vary depending on the polymer used, a suitable drying time is about 30 minutes at 80° C. and about 240 minutes at 65° C. per about 20 kg of the gel particles.

Still another method for adding the higher fatty acid or the alkali metal salt thereof to the gel comprises adding a powder or slurry thereof to medium-sized gel particles (size before crushing: a size suitable for transportation of gel lumps, for example, from about 10 mm to about 300 mm). In this method, the gel lumps are crushed after the higher fatty acid or the alkali metal salt thereof has been added. In this case, the gel lumps are mixed in the crusher, and the higher fatty acid or the alkali metal salt thereof is distributed fairly uniformly on the surfaces of the small gel particles. According to this method, a part of the higher fatty acid or the alkali metal salt thereof added is incorporated into the small gel particles, but the effect achieved is substantially the same as when the higher fatty acid or the alkali metal salt thereof is applied only to the surfaces of the gel particles.

The following Examples are given to illustrate the present invention in greater detail. Unless otherwise indicated, all parts, percents, ratios and the like are by weight.

The following items were the same in these examples in which the effect of the higher fatty acid or the alkali metal salt thereof in the polymerization system was evaluated as:

POLYMERIZATION VESSEL AND OTHER EQUIPMENT

Frustoconical stainless steel (SUS-304) vessels each of which had a wall thickness of 1 mm, a bottom diameter of about 10 cm, a top diameter of about 12 cm and a height of about 35 cm and was entirely open at the top were used. One such vessel was chrome-plated. The inner surface of each vessel was polished with a No. 400 buff to provide a smooth finished surface (in the chrome-plated vessel, the polishing was prior to plating), and then fully washed with a mixture of a household polishing powder and a household liquid detergent. The cleaning was considered completed when the entire surface could be wetted with a film of deionized water.

A rubber stopper was provided at the open portion at the top. The stopper was fitted with a thermometer, a nitrogen gas inlet equipped with a bubble dispersing ball filter, and a glass tube for discharging nitrogen and adding polymerization initiator.

Each vessel of the above structure was positioned in a wooden case packed with foamed polystyrene beads for thermal insulation.

EXAMINATION OF ADHESIVENESS

The adhesion between the gel and the polymerization vessel was determined by evaluating the behavior of the gel as it was withdrawn from the polymerization vessel after the polymerization was completed.

For this purpose, stainless steel (SUS-304) wire with a diameter of about 4 mm was formed into an isosceles triangular shape having a base of about 9 cm and a height of about 12 cm as a test handle and two such test handles were suspended in the polymerization vessel when the monomer solution was being fed into the vessel. The two test handles were suspended using threads tied to the apexes of the triangles so that the bases of the two triangles were parallel to each other and so that the bases were situated at a depth of about 5 cm below the liquid level of the monomer solution fed. After the polymerization was completed, the test handles remained buried in the gel.

The threads suspending the test handles were fixed to two diametrically opposite edges of the top open portion of the polymerization vessel using an adhesive tape.

METHOD FOR EVALUATING THE CONDITION OF ADHESION

The condition of the adhesion of the gel to the polymerization vessel was examined by moving the apexes of the two test handles, which had been positioned at the time of feeding the monomer solution with the bases being kept parallel to each other, toward each other, and pulling them upwards in a perpendicular direction. At this time, the relationship between the polymerization vessel, the gel and the test handles was evaluated using the following grades.

(I) In bringing the apexes of the two test handles close to each other or after contacting them with each other, the force to pull the gel around the two sides of the test handles away from the wall of the vessel caused the gel to separate from the wall of the polymerization vessel. Thus, when the test handles were pulled up, the gel, as a unitary structure, came out from the polymerization vessel.

(II) The gel did not separate from the polymerization vessel when the apexes of the test handles were contacted with each other. When the test handles were pulled on, the gel separated from the polymerization vessel, and then the gel, as a unitary structure, came out of the polymerization vessel.

(III) The gel did not separate from the polymerization vessel when the apexes of the test handles were contacted with each other. When the test handles were pulled up a part of the gel separated from the polymerization vessel, but the entire gel could not be pulled out of the polymerization vessel.

(IV) When the apexes of the test handles were contacted with each other and the test handles were pulled up, the gel did not separate or come up from the polymerization vessel.

The speed of pulling up the test handles was such that it was not markedly faster than the speed at which the gel deformed as a result of its own viscoelasticity as the test handles were pulled up.

In general, where the gel could not be withdrawn, the gel was broken by the handles buried in the gel. In a rare case, the gel deformed due to its own viscoelasticity, and partly remained in the polymerization vessel.

EXAMPLE 1

Polymerization was performed using five stainless steel polymerization vessels and one stainless steel polymerization vessel with a chrome-plated inner surface.

Each of the polymerization vessels was charged with 1,900 g of an aqueous monomer solution prepared by dissolving acrylamide in deionized water in an acrylamide concentration of 24.2%, and 100 g of a 30% aqueous solution of a mixture (2:3 by weight) of sodium hydroxide and boric acid. Each of the fatty acids indicated in the following table was added in the amounts indicated. Each of the polymerization vessels were closed with a rubber stopper, and the rubber stoppers were sealed therein using a vinyl tape. Nitrogen was introduced through the nitrogen gas inlet at a rate of about 3 liters/min. for about 30 minutes to expel the dissolved oxygen. In the meantime, a rod-like submerged-type heater was placed in the polymerization vessels utilizing the glass tube, and the temperature of the solution was adjusted to 25° to 25.5° C. About 3 to 5 minutes before the completion of nitrogen introduction, a 2.4% aqueous solution of dimethylaminopropionitrile (as a redox type polymerization initiator), then a 2% aqueous solution of azobiscyanovaleric acid (as a thermally decomposable polymerization initiator) (pH adjusted to about 7 with sodium hydroxide), and finally a 1.6% aqueous solution of potassium persulfate were introduced into the vessel, each in an amount of 5 ml.

Introduction of nitrogen was continued for several hours after the addition of the polymerization initiators to achieve uniform mixing. The nitrogen introduction tube was raised until the bubble-dispersing ball filter at the tip thereof was positioned in the space within the polymerization vessel, and then the introduction of nitrogen was stopped. The upper end of the nitrogen discharge glass tube was sealed.

Since the polymerization vessel was insulated, the polymerization proceeded adiabatically. Hence, the start of the polymerization, the progress of the polymerization and the termination of the polymerization can be determined by use of the thermometer.

In this run, polymerization started within 5 to 10 minutes after the addition of the polymerization initiator to the six polymerization systems. 60 to 70 minutes after the start of the polymerization, the thermometer showed a maximum value of about 91° C., thus indicating a termination of the polymerization.

The temperatures of the polymerization systems gradually decreased after this maximum temperature was attained. This is considered to be due to the incomplete thermal insulation of the polymerization vessel.

About 30 minutes after the maximum temperature of the polymerization system had been reached, the effects of the added higher fatty acids were determined by evaluating the state of gel adhesion. The results obtained are shown in the following table.

| Inner Wall of Polymerization Vessel | Run No. | | | | | |
|---|---|---|---|---|---|---|
| | 1 | 2 | 3 | 4 | 5 | 6 |
| | SUS-304 | SUS-304 | SUS-304 | SUS-304 | SUS-304 | Chrome-plated |
| Higher Fatty Acid (%) | Stearic acid (A) | Stearic acid (B) | Arachidic acid | Behenic acid | None | Stearic acid (B) |
| 0.01 | I | I | I | I | * | I |
| 0.004 | I | I | — | — | * | — |
| 0.001 | I | I | — | — | * | — |
| 0.0005 | II | II | — | — | * | — |

"—" not tested because results appeared to be substantially I or II.
* corresponded to IV In the above table, stearic acid (A) comprised 55.0% stearic acid, 32.8% palmitic acid and 4.8% other saturated fatty acids; and stearic acid (B) comprised 93.5% stearic acid, 1.6% palmitic acid and 2.0% saturated fatty acids. In all of the acids, the remainder was mainly unsaturated fatty acids.

The results tabulated above are the averages of seven replications.

EXAMPLE 2

Two stainless steel (SUS-304) vessels which had a bottom diameter of about 38 cm, a top diameter of about 52 cm, a depth of about 65 cm and an inner capacity of about 100 liters and which was entirely open at the top were set up. They were cleaned in a manner similar to that described in Example 1.

76 kg of an aqueous solution of acrylamide and 4 kg of an aqueous solution of a mixture of sodium hydroxide and boric acid, as described in Example 1, were fed into each of the vessels. Into one of the polymerization vessels, 8 g of stearic acid (B) was fed. The two polymerization vessels were each placed in a constant-temperature tank which was capable of following the temperature of the polymerization vessel. The vessels were sealed, and the dissolved oxygen was sufficiently expelled using nitrogen. The same polymerization initiators as used in Example 1 were added, each in an amount of 200 ml in the same sequence.

The temperature at the start of the polymerization was about 25° C. in both vessels, and the maximum temperature at the end of the polymerization was about 92° C. During the polymerization, the temperature of the constant-temperature tank followed the inside temperature of the polymerization vessel. At the end of polymerization, the temperature of the constant temperature tank was set at 90° C., and the products were aged for about 14 hours.

After the aging, stearic acid (B) remained adhered to the surface of the gel in the undissolved state in an amount which appeared to correspond to the amount added. It was found therefore that the stearic acid (B) scarcely dissolved in the aqueous solution of acrylamide.

The polymerization vessels were each turned upside down to withdraw the gel therein. The gel formed in the vessel to which stearic acid (B) had been added came out of the vessel immediately after the vessel was turned upside down. The gel in the vessel in which no higher fatty acid was added did not come out due to its own weight, and the gel had to be removed.

EXAMPLE 3

Using two polymerization vessels as described in Example 2, 17.5 kg of acrylamide, 0.92 kg of dimethylaminoethyl methacrylate, 300 g of a 96% sulfuric acid aqueous solution and 160 g of polyethylene glycol having an average molecular weight of 6,250 were dissolved in deionized water to form 80 kg of a monomer solution in each of the polymerization vessels.

Sodium stearate was added in an amount of 3.2 g to the monomer solution which was placed in the polymerization vessel in which in Example 2 stearic acid (B) had been added. Each of the monomer solutions were sufficiently deoxygenated by nitrogen purging in the same manner as in Example 2. At 28° C., 8.0 g of 2,2'-azobis-2-amidinopropane hydrochloride was added to each as a polymerization initiator, and polymerization was performed adiabatically. Within 180 minutes, the polymerization was completed, and the temperature of the polymer reached 95° C. at the highest because of the heat of polymerization.

The two polymerization vessels were each turned upside down in an attempt to withdraw the resulting gels. The gel to which sodium stearate had been added came out of the vessel due to its own weight. The gel to which no sodium stearate had been added did not come out merely by turning the vessel upside-down.

Using the polymerization vessel in which polymerization had been performed in the presence of sodium stearate, the above-described monomer solution was polymerized without adding sodium stearate, and the same procedure as above was repeated. The gel came out of the vessel immediately after the vessel was turned upside-down.

EXAMPLE 4

The following evaluation was performed in the same manner as in Example 1. A newly cleaned stainless steel vessel was used, and the amount of the fatty acid salt, as described below, added was 0.004% based on the monomer solution fed (that is, 80 mg). The polymerization was performed using various fatty acid salts.

As a result, it was found that lithium stearate and potassium stearate were effective in reducing the adhesiveness of the gel, but barium stearate and calcium stearate were not effective.

EXAMPLE 5

In a manner similar to Example 1, two stainless steel (SUS-304) polymerization vessels were used. To one of the vessels, 100 ppm of stearic acid (A) was added, and no additive was placed in the other vessel. There was no appreciable difference between the two vessels in the behavior of the polymerization.

The resulting gels were aged in a similar manner as in Example 2, and removed from the polymerization vessels. The gels were then minced to about 3 mm, and dried at about 60° C. for about 16 hours in a box-type dryer. The dried gels were pulverized to about 0.05 mm, and their properties as as flocculating agents were tested as shown in the following table. No difference between the two dried gels was found.

|  | 100 ppm of Stearic Acid (A) Added | No Additive |
|---|---|---|
| Viscosity of 0.1% Aqueous Solution of the dried pulverized gel measured by a B-type viscometer (centipoises)[1] | 620 | 640 |
| Ratio of Hydrolysis (%) | 14.3 | 14.2 |
| Flocculating Time of a Kaolin Slurry[2] | 18 sec./ 9 sec. | 25 sec./ 9 sec. |

[1]BL-type rotor No. 1; 6 rpm
[2]The time required for the flock interface to decrease to half when the dried pulverized gel was added in an amount of 5 ppm/10 ppm respectively to 100 ml of a 5% slurry of kaolin (a product of Ishizu Kaolin Co., Ltd.).

EXAMPLE 6

A stainless steel (SUS-304) vessel which had a bottom diameter of about 38 cm, a top diameter of about 52 cm, a depth of about 65 cm and an inner capacity of about 100 liters and which was entirely open at the top was charged with 76 kg of a 24.2% aqueous solution of acrylamide and 4 kg of a mixture (2:3 by weight) of sodium hydroxide and boric acid. While deoxygenating with nitrogen, the temperature was adjusted to 25° to 25.5° C. A 2.4% aqueous solution of dimethylaminopropionitrile, then, a 2% aqueous solution of azobiscyanovaleic acid and finally a 1.6% aqueous solution of potassium persulfate were added each in an amount of 200 ml.

The temperature at the start of the polymerization was about 25° C., and the maximum temperature at the end of the polymerization was about 92° C. After the polymerization, the product was aged for about 14 hours while holding the temperature of the constant-temperature tank at 90° C.

About 20 kg of the gel was minced by a crusher (extruder) equipped with an internal cutter and having a porous plate with a pore diameter of 3.2 mm. The minced gel was stacked in the form of a mound with a base diameter of about 50 cm. Two such mounds were prepared, and stearic acid (93.5% of stearic acid, 1.6% of palmitic acid; 2.0% of other saturated fatty acids; remainder being unsaturated fatty acids) was sprinkled over the mounds in an amount of 2 g to the first mound and 1 g to the second mound using a 32 mesh Tyler sieve.

The gels were then dried at about 80° C. for 30 minutes, and then at about 60° C. for 240 minutes using a batchwise rotary cylindrical dryer at a cylinder rotating speed of 4.5 rpm to obtain polymer particles in the substantially dried state.

The dryer used included a cylindrical stainless steel (SUS-304) sheet which had a diameter of 470 mm and a width of 560 mm and which was horizontally positioned. The stainless steel sheet had pores therein with a diameter of 2 mm at intervals with a pitch i.e., pore separation distance, of 4 mm along the entire width thereof on the entire inner circumferential surface thereof. Furthermore, the stainless steel sheet was a corrugated sheet having an inverted triangular form with one side measuring 50 cm. The part from the lowermost end of the circumference to a point displaced at an angle of 70° was constructed as an opening for the entry of hot air, and the upper part of the circumference was constructed as a gas discharging section. Thus, the hot air could be blown against the gel particles from below in an oblique direction.

The small gel lumps to which the stearic acid had not been added before entry into the dryer flowed in a very early stage (for about 60 seconds) of the drying operation, but gradually began to adhere to the corrugated stainless steel sheet. The gel lumps grew and after a lapse of within about 10 minutes, most of the gel lumps covered the stainless steel sheet. The gel lumps showed sign of further growth. Then, the adhering gel was separated mechanically, and the drying was continued. About 30 minutes after the beginning of drying, the gel lumps no longer adhered to the stainless steel sheet, and could be dried without difficulty. More than half of the dried particles of gel were in an individually separated state, but the remainder comprised larger particles of coalesced single particles which were considered to be the result of growth on the stainless steel sheet.

On the other hand, the gel to which stearic acid had been added showed much the same behavior from the very early stage of the drying operation until about 2 to 5 minutes later when adhesion to the stainless steel sheet began. The small gel lumps which adhered to the stainless steel sheet grew to some extent, but when the growth proceeded to a certain point, the gel lumps spontaneously separated from the sheet due to the shearing force caused by their own weight.

The most outstanding difference was the property of the gel particles after drying. The particles which adhered to the stainless steel sheet in the early stage of drying, although in small amounts, apparently adhered to each other. After the drying, however, most of these particles separated from each other, and the proportion of those particles which adhered to each other was extremely small in the dried particles.

EXAMPLE 7

Stearic acid (20 g) was added to 500 cc of tap water placed in a juice blender. The mixer was rotated for about 5 minutes to form a slurry of stearic acid. About 30 cc of the resulting slurry was sprayed using a rotary disc type sprayer onto about 20 g of a mound of gel particles produced in the same manner as in Example 6.

The small gel lumps obtained were dried by the same operation as in Example 6. Their behavior at the time of drying was the same as with the gel containing stearic acid in Example 6. The dried particles comprised almost wholly separated single particles.

EXAMPLE 8

A gel lump was cut into 20 rods, each having a size of about 5 cm ×5 cm ×30 cm. The rods were aligned with their sides in contact with each other, and 3 g of a stearic acid powder was sprinkled over the rods using a sieve in the same manner as in Example 6.

The rods of the gel were crushed to obtain about 16 kg of small gel particles, and then dried using the same dryer as described in Example 6.

The behavior of the gel particles at the time of drying was much the same as in Examples 6 and 7.

COMPARATIVE EXAMPLE 1

A stearic acid slurry having a concentration of about 4% as described in Example 7 was diluted to 10 times by weight its amount using water. 30 cc of the resulting slurry was sprayed onto the gel particles in the same way as in Example 7. The gel particles were then dried. The behavior of the gel particles at the time of drying was better than in the case of not adding stearic acid, but a sufficient adhesion-preventing effect could not be obtained. A considerable portion of the dried particles comprising lumps resulting from the adhesion of single particles.

While the invention has been described in detail and with reference to specific embodiments thereof, it will be apparent to one skilled in the art that various changes and modifications can be made therein without departing from the spirit and scope thereof.

What is claimed is:

1. A method for preventing the surface of a hydrogel of a water-soluble acrylamide-type polymer from being tacky, which comprises coating the surface of said hydrogel with a member selected from the group consisting of a higher fatty acid, an alkali metal salt of a higher fatty acid and mixtures thereof.

2. The method of claim 1, wherein the amount of the higher fatty acid or the alkali metal salt thereof is about 0.01% by weight or less based on the weight of the monomer forming said polymer.

3. The method of claim 1, wherein the amount of the higher fatty acid or the alkali metal salt thereof is 0.005 to 0.001% by weight based on the weight of the monomer forming said polymer.

4. The method of claim 1, wherein the higher fatty acid contains 14 to 24 carbon atoms.

5. The method of claim 1, wherein the acrylamide-type polymer is selected from the group consisting of polyacrylamide, partially hydrolyzed products of polyacrylamide and water-soluble copolymers of acrylamide with other vinyl monomers.

6. The method of claim 1, wherein the higher fatty acid or the alkali metal salt thereof is added to the polymerization system prior to forming the acrylamide-type polymer.

7. A method for drying a hydrogel of a water-soluble acrylamide-type polymer comprising coating the surface of the hydrogel with at least one of a higher fatty acid or an alkali metal salt thereof and drying the hydrogel.

* * * * *